United States Patent
Mocotte et al.

[11] 3,869,551
[45] Mar. 4, 1975

[54] CERTAIN CARBONATES USEFUL FOR CONTROLLING MOLLUSKS AND AQUATIC ORGANISMS

[75] Inventors: Jacques Mocotte, St. Didier au Mont d'Or; Monique Druet, Lyon, both of France

[73] Assignee: Progil, Paris, France

[22] Filed: Jan. 3, 1973

[21] Appl. No.: 320,742

Related U.S. Application Data

[63] Continuation of Ser. No. 53,992, July 10, 1970, abandoned.

[30] Foreign Application Priority Data
July 25, 1969 France.................... 69.25380

[52] U.S. Cl.................. 424/301, 71/67, 106/15 AF
[51] Int. Cl............................................. A01n 9/24
[58] Field of Search ................ 424/301; 106/15 AF

[56] References Cited
UNITED STATES PATENTS
| | | | |
|---|---|---|---|
| 2,790,267 | 4/1957 | Lee.................................... | 424/301 |
| 3,234,082 | 2/1966 | Pianka et al....................... | 424/301 |
| 3,287,211 | 11/1966 | Szabo et al........................ | 424/301 |

*Primary Examiner*—Vincent D. Turner
*Attorney, Agent, or Firm*—Browdy and Neimark

[57] ABSTRACT

The use of compositions for combating mollusks and aqueous organisms having an active agent a carbonic acid ester according to the formula

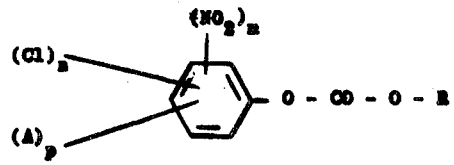

in which A is a branched or linear alkyl group;

$m$, $n$ and $p$ are integers the sum of which is between 2 and 5, $m$ having the value of 1 to 3, while $n$ and $p$ may each vary between 0 and 2, R corresponds to an alkyl or phenyl radical, preferably substituted with one or more chlorine atoms or to the radical

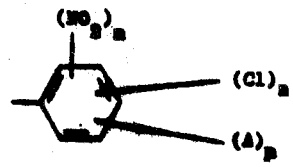

24 Claims, No Drawings

CERTAIN CARBONATES USEFUL FOR CONTROLLING MOLLUSKS AND AQUATIC ORGANISMS

This is a continuation, of application Ser. No. 53,992, filed July 10, 1970, now abandoned.

The present invention relates to the utilization of some esters of carbonic acid and nitrophenols as agents for controlling mollusks and aquatic organisms.

It is an object of the present invention to provide compositions containing these compounds as active substances for protecting against mollusks and aquatic organisms.

Numerous nitrophenyl carbonates have already been described, having fungicidal, herbicidal, insecticidal, or acaricidal properties.

It has now been found that a particular group of nitrophenyl carbonates possess a notable activity, in small doses, against mollusks and aquatic organisms.

Products according to the present invention correspond to the following formulation:

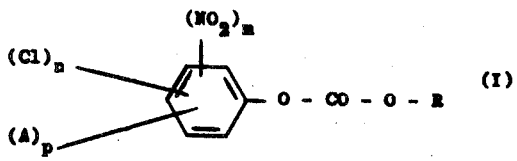

in which A is a branched or linear alkyl group, $m$, $n$ and $p$ are integers the sum of which is between 2 and 5, $m$ having the value of 1 to 3, while $n$ and $p$ may each vary between 0 and 2, R corresponds to an alkyl or phenyl radical, preferably substituted with one or more chlorine atoms or to the radical

Thus, the esters may be either symmetric carbonates, that is having two aromatic rings both containing the same substituents, or mixed nitrophenyl and alkyl carbonates or nitrophenyl and chlorophenyl carbonates. The term, "nitrophenyl", when used in the present description includes any radical defined in formula (I) hereinabove and the term "chlorophenyl," corresponds to a mono- or polychloro-phenyl group).

Illustrative of the compounds usable according to the present invention are the following:

a. methyl or ethyl and 2,4-dinitro-phenyl, or 2,4-dichloro-6-nitro-phenyl, or 4-chloro-2,6-dinitrophenyl, or 2-methyl-4,6-dinitrophenyl, or 2-tert.butyl-4,6-dinitrophenyl carbonates.

b. 2,4-dichloro-phenyl or 2,4,6-trichloro-phenyl or pentachlorophenyl and 2,4-dichloro-6-nitro phenyl, or 4-chloro-2, 6-dinitrophenyl, or 2-methyl-4,6-dinitro-phenyl or 2-tert.butyl-4,6-dinitro phenyl carbonates.

c. bis (2,4-dichloro-6-nitro phenyl) or bis (4-chloro-2,6-dinitro-phenyl) [or bis (4-chloro-2,6-dinitro-phenyl)] or bis (2-methyl-4,6-dinitro phenyl) or bis (2-tert.butyl-4,6-dinitrophenyl) carbonates.

Moreover, according to a modification of the invention utilizing chlorophenyl and nitrophenyl carbonates, the chlorophenyl radicals may be mixtures of chlorophenols as for example 2,4-dichloro, 2,6-dichloro phenols and 2,4,6-trichlorophenol.

Those products which are known chemical compounds are available by conventional methods as for example: phosgene action on the corresponding nitrophenol in the presence of a HCl acceptor, for symmetric carbonates; reaction of a nitrophenyl chloroformate with an alcohol, for alkyl and nitrophenyl carbonates; reaction of a phenyl chloroformate and of a phenol, for nitrophenyl and chlorophenyl carbonates, the free phenol used being either chlorophenol or nitrophenol.

The present invention relates to the molluskicidal activity of the compounds of formula (I). This action takes place both on fresh water mollusks (for example, mollusks bearing Schistosoma Haematobium, trematode responsible for the illness "biharziose") and on terrestrial and sea water mollusks (especially pholas and borers). Moreover, it has been found that development inhibiting or destroying effect produced by those substances is extended in a more general way to other aquatic organisms and especially algae, crustacea, hydra, bryozoa, ascidia, etc. Such an activity makes these compounds very valuable for controlling marine foulings. Indeed it is known that the fouling of structures immersed in sea water and of ship hulls, is due to the proliferation of the precited aquatic organisms, and causes considerable damages and losses.

Thus, the field of application of the nitrophenyl carbonates described hereinabove is quite large. They may, for example, be used in rivers, for destroying mollusks for sanitary purposes; or they may be introduced onto or into materials intended to be immersed, as for example, wood used for the fabrication of piers, flying bridges and other fittings, or natural or synthetic polymers used especially for the fabrication of sub-marine cables. They may also be incorporated in coating compositions such as anti-fouling varnishes or paints which are applied for protective purposes on the material which is to be contacted with sea water.

The compounds used according to the present invention, which are generally crystalline solids, occassionally oils, may be used such as they are, or according to usual formulations, for the uses intended. For example they are used, in the state of finely ground or agglomerated solids or for wood treatment especially, in the form of aqueous emulsions, or organic, or hydroorganic solutions. In the latter cases, there may be used as organic solvents the conventional products, namely, hydrocarbons such as toluene, xylene, petroleum cuts such as white spirits; alcohols; ketones such as acetone or methylisobutylketone; etc. They may have associated therewith various adjuvants as penetrating agents such as aromatic petroleum cuts; fixing agents such as carboxymethylcellulose, polyvinyl alcohol, colophony; anti-flocculating agents such as alkali metals lignosulfonates, alginates. If it is desired to protect wood by depth impregnation, the methods of injection of the treatment compositions may be chosen among known pressure/vacuum techniques, such as Bethell, Taylor-Colquitt, Drillon processes, etc. Further, the nitrophenyl carbonates according to the invention are quite compatible with the conventional constituents of antifouling coatings and paints.

The amounts of active substances which may be used may vary within large limits. However, it is interesting to note that these compounds are quite efficient even in small quantities. Tests have shown, for example, that the amounts of the esters varying according to contemplated specific compounds, between 0.1 and 2.5 parts per million (p.p.m) were sufficient for destroying young mollusks of the Limnea Stagnalis species. When those carbonates are incorporated into protective coatings or paints, their ratio, in the compositions, may be such that they are present on the protected material in amounts in the range of from 20 to 50 gr. per $m^2$. For wood treatment by deep impregnation, liquid formulations are generally used containing 3 to 10% by weight of active matter. In compositions based upon polymers they are efficient from amounts of 2%.

The following examples illustrate the activity and various application methods for several nitrophenyl carbonates according to the invention. For purposes of simplification they will be designated as follows:

A - methyl and 2-tert.butyl-4,6-dinitro-phenyl carbonate.

B - ethyl and 2,4-dichloro-6-nitro phenyl carbonate.

C - chlorophenyl and 2-tert.butyl-4.6-dinitro phenyl carbonate, chlorophenyl radicals being derived from a mixture of 2,4-dichloro 2,6-dichloro and 2,4,6-trichloro-phenols.

D - pentachlorophenyl and 2-tert.butyl- 4,6-dinitro phenyl carbonate.

E - bis (2-tert.butyl-4,6-dinitro phenyl) carbonate.

EXAMPLE 1

For 24 h. young mollusks of the Limnea Stagnalis species were immersed in liquid formulations containing, besides the active product, water, a polyalcohol ether known under the name of "Polyglycol 400" (condensation product of ethylene oxide on water having an average MW of 400) and a polyoxyethylene-sorbitan mono-oleate (known as Tween 80) as an emulsifying agent. After the indicated period, dead animals have been counted. The results obtained are summarized in table 1.

Table 1

| Active agents | Amounts of active substance in the liquid composition (parts per million) | % mollusks Dead rate |
| --- | --- | --- |
| A | 0.1 | 60 |
|   | 0.25 | 100 |
|   | 0.5 | 100 |
| B | 1 | 70 |
|   | 2.5 | 100 |
| C | 0.5 | 70 |
|   | 1 | 100 |
|   | 2.5 | 100 |
| D | 0.5 | 70 |
|   | 1 | 100 |
|   | 2.5 | 100 |
| E | 0.1 | 80 |
|   | 0.25 | 100 |
|   | 0.5 | 100 |

EXAMPLE 2

Onto samples of Norway pine sapwood, a double coating of a marine type varnish, containing 7.5% by weight of product E was applied. Application was conducted so as to obtain a coating of about 400 gr/m2 of wood.

The varnish was mainly composed of a formo-phenolic resin modified with flax and China woodpils.

After 6 months of immersion in the Atlantic Ocean, along the French coast, the following results were noted, concerning molluskicidal effect:

Borer dominating stump: Teredo Navalis
Samples coated with varnish having no molluskicidal agent:
  entirely crossed with galleries of parasites.
Samples treated with product E:
  No trace of borer penetration; presence of some holes hardly visible to the naked eye.

EXAMPLE 3

Into samples of Norway pine sapwood there was injected, by the Bethell process, using a pressure of 7 kg/cm2, a 5% solution of product E in xylene, containing a resin as a fixing agent. The quantity of injected solution varied, according to the samples, from 300 to 400 $kg/m^3$ of wood. After 1 year of immersion in the Atlantic Ocean along the French coast, the following results were noted:

Treated samples:
  very small dispersed galleries of borers, some tubes of hydra and some shrubs of bryozoa remained microscopic, some balani stopped in their development.

Non-treated samples:
  covered with algae (enteromorphes), balani, hydra, turf and shrub-bryozoa; numerous borer galleries in depth.

It will be obvious to those skilled in the art that various changes may be made without departing from the scope of the invention and the invention is not to be considered limited to what is described in the specification.

What is claimed is:

1. A method of controlling mollusks and aquatic organisms selected from the group consisting of crustacea, hydra, bryozoa and ascidia which comprises:
applying to said mollusks and aquatic organisms in water, an effective amount to kill said mollusks and aquatic organisms of methyl-(2-methyl-4,6-dinitrophenyl) carbonate.

2. The method according to claim 1 wherein said effective amount is 0.1 to 2.5 ppm with regard to said water.

3. A method of controlling mollusks and aquatic organisms selected from the group consisting of crustacea, hydra, bryozoa and ascidia which comprises:
applying to said mollusks and aquatic organisms in water, an effective amount to kill said mollusks and aquatic organisms of ethyl-(2-methyl-4,6-dinitrophenyl) carbonate.

4. The method according to claim 3 wherein said effective amount is 0.1 to 2.5 ppm with regard to said water.

5. A method of controlling mollusks and aquatic organisms selected from the group consisting of crustacea, hydra, bryozoa and ascidia which comprises:
applying to said mollusks and aquatic organisms in water, an effective amount to kill said mollusks and aquatic organisms of methyl-(2-tert. butyl-4,6-dinitrophenyl) carbonate.

6. The method according to claim 5 wherein said effective amount is 0.1 to 2.5 ppm with regard to said water.

7. A method of controlling mollusks and aquatic organisms selected from the group consisting of crustacea, hydra, bryozoa and ascidia which comprises:
applying to said mollusks and aquatic organisms in water, an effective amount to kill said mollusks and aquatic organisms of ethyl-(2-tert.butyl-4,6-dinitrophenyl) carbonate.

8. The method according to claim 7 wherein said effective amount is 0.1 to 2.5 ppm with regard to said water.

9. A method of controlling mollusks and aquatic organisms selected from the group consisting of crustacea, hydra, bryozoa and ascidia which comprises:
applying to said mollusks and aquatic organisms in water, an effective amount to kill said mollusks and aquatic organisms of bis (2-methyl-4,6-dinitrophenyl) carbonate.

10. The method according to claim 9 wherein said effective amount is 0.1 to 2.5 ppm with regard to said water.

11. A method of controlling mollusks and aquatic organisms selected from the group consisting of crustacea, hydra, bryozoa and ascidia which comprises:
applying to said mollusks and aquatic organisms in water, an effective amount to kill said mollusks and aquatic organisms of bis (2-tert. butyl-4,6-dinitrophenyl) carbonate.

12. The method according to claim 11 wherein said effective amount is 0.1 to 2.5 ppm with regard to said water.

13. A method of protecting wood intended to be immersed in water against the attacks of mollusks and aquatic organisms selected from the group consisting of crustacea, hydra, bryozoa and ascidia which comprises:
incorporating in said wood an effective amount to protect said wood from said mollusks and aquatic organisms of methyl-(2-methyl-4,6-dinitrophenyl)-carbonate.

14. The method according to claim 13 wherein said effective amount is incorporated in said wood as a 3 to 10% solution in a solvent selected from the group consisting of toluene, xylene, white-spirits, acetone and methylisobutylketone.

15. A method of protecting wood intended to be immersed in water against the attacks of mollusks and aquatic organisms selected from the group consisting of crustacea, hydra, bryozoa and ascidia which comprises:
incorporating in said wood an effective amount to protect said wood from said mollusks and aquatic organisms of ethyl-(2-methyl-4,6-dinitrophenyl)-carbonate.

16. The method according to claim 15 wherein said effective amount is incorporated in said wood as a 3 to 10% solution in a solvent selected from the group consisting of toluene, xylene, white-spirits, acetone and methylisobutylketone.

17. A method of protecting wood intended to be immersed in water against the attacks of mollusks and aquatic organisms selected from the group consisting of crustacea, hydra, bryozoa and ascidia which comprises:
incorporating in said wood an effective amount to protect said wood from said mollusks and aquatic organisms of methyl-(2-tert. butyl-4,6-dinitrophenyl) carbonate.

18. The method according to claim 17 wherein said effective amount is incorporated in said wood as a 3 to 10% solution in a solvent selected from the group consisting of toluene, xylene, white-spirits, acetone and methylisobutylketone.

19. A method of protecting wood intended to be immersed in water against the attacks of mollusks and aquatic organisms selected from the group consisting of crustacea, hydra, bryozoa and ascidia which comprises:
incorporating in said wood an effective amount to protect said wood from said mollusks and aquatic organisms of ethyl-(2-tert. butyl-4,6-dinitrophenyl) carbonate.

20. The method according to claim 19 wherein said effective amount is incorporated in said wood as a 3 to 10% solution in a solvent selected from the group consisting of toluene, xylene, white-spirits, acetone and methylisobutylketone.

21. A method of protecting wood intended to be immersed in water against the attacks of mollusks and aquatic organisms selected from the group consisting of crustacea, hydra, bryozoa and ascidia which comprises:
incorporating in said wood an effective amount to protect said wood from said mollusks and aquatic organisms of bis (2-methyl-4,6-dinitrophenyl) carbonate.

22. The method according to claim 21 wherein said effective amount is incorporated in said wood as a 3 to 10% solution in a solvent selected from the group consisting of toluene, xylene, white-spirits, acetone and methylisobutylketone.

23. A method of protecting wood intended to be immersed in water against the attacks of mollusks and aquatic organisms selected from the group consisting of crustacea, hydra, bryozoa and ascidia which comprises:
incorporating in said wood an effective amount to protect said wood from said mollusks and aquatic organisms of bis (2-tert. butyl-4,6-dinitrophenyl) carbonate.

24. The method according to claim 23 wherein said effective amount is incorporated in said wood as a 3 to 10% solution in a solvent selected from the group consisting of toluene, xylene, white-spirits, acetone and methylisobutylketone.

* * * * *